US010771629B2

(12) United States Patent
Dorsey et al.

(10) Patent No.: US 10,771,629 B2
(45) Date of Patent: Sep. 8, 2020

(54) SYSTEM AND METHOD FOR TRANSFORMING A VOICEMAIL INTO A COMMUNICATION SESSION

(71) Applicant: BABYTEL INC., Montreal (CA)

(72) Inventors: Stephen Dorsey, Montreal (CA); Pierre St-Germain, Montreal (CA); Mohamed Kahla, Laval (CA); Khaled Tewfik, Saint-Lazare (CA)

(73) Assignee: babyTel Inc., Montreal (CA)

( * ) Notice: Subject to any disclaimer, the term of this patent is extended or adjusted under 35 U.S.C. 154(b) by 0 days.

(21) Appl. No.: 15/885,217

(22) Filed: Jan. 31, 2018

(65) Prior Publication Data

US 2018/0227424 A1    Aug. 9, 2018

Related U.S. Application Data

(60) Provisional application No. 62/455,013, filed on Feb. 6, 2017.

(51) Int. Cl.
*H04M 3/533* (2006.01)
*H04M 1/725* (2006.01)
(Continued)

(52) U.S. Cl.
CPC ............ *H04M 3/533* (2013.01); *G10L 15/26* (2013.01); *H04M 1/72552* (2013.01);
(Continued)

(58) Field of Classification Search
CPC ....... G10L 15/26; G10L 15/265; G10L 15/22; G10L 15/30; G10L 15/02;
(Continued)

(56) References Cited

U.S. PATENT DOCUMENTS 6,507,643 B1    1/2003  Groner
7,007,085 B1    2/2006  Malik
(Continued)

FOREIGN PATENT DOCUMENTS

CN            104159207 A  * 11/2014

OTHER PUBLICATIONS

InstaVoice [online], [archived on Jun. 1, 2016], Retrieved from the Internet: <URL: https://web.archive.org/web/20160601155019/http://www.instavoice.com/> (Year: 2016).*

(Continued)

*Primary Examiner* — Daniel Lai
(74) *Attorney, Agent, or Firm* — Benoit & Cote, Inc.; Ibrahim Tamer

(57) ABSTRACT

A system and method for transforming a voicemail message into a chat session between a first party and a second party. The method comprises receiving, at a remote server, a voice message from the first party which is destined for the second party. The server transcribes the voice message, which involves transforming the voice message into a text. The server then initiates the chat session between the first party and the second party, by sending the text and audio as a multi-media instant message (IM) to the first party and to the second party. The IM appears as an outgoing message on a first computing device associated with the first party, and as an incoming message on a second computing device associated with the second party.

14 Claims, 12 Drawing Sheets

US 10,771,629 B2
Page 2

(51) Int. Cl.
*H04W 4/14* (2009.01)
*G10L 15/26* (2006.01)
*H04M 7/00* (2006.01)
*H04M 3/537* (2006.01)

(52) U.S. Cl.
CPC ..... *H04M 3/53333* (2013.01); *H04M 7/0045* (2013.01); *H04W 4/14* (2013.01); *H04M 3/537* (2013.01); *H04M 2201/40* (2013.01); *H04M 2203/4536* (2013.01)

(58) Field of Classification Search
CPC .......... G10L 2015/223; G10L 15/1815; G10L 17/22; G10L 2015/228; H04L 51/046; H04L 51/36; H04L 51/066; H04L 51/08; H04L 51/063; H04L 51/10; H04L 51/04; H04L 51/16; H04L 51/38; H04L 51/24; H04L 51/32; H04M 2201/40; H04M 1/7255; H04M 3/42221; H04M 1/651; H04M 3/42382; H04M 7/0042; H04M 2203/252; H04M 3/5322; H04M 3/533; H04M 1/72552; H04M 3/537; H04M 2203/4536; H04M 3/4936; H04M 2215/208; H04M 3/42042; H04M 3/42365; H04M 2201/60; H04M 3/53333; H04M 1/72519; H04M 2207/18; H04M 1/72536; H04M 3/42093; H04M 3/4228; H04M 11/00; H04M 1/64; H04M 3/42161; H04M 1/2478; H04M 1/2535; H04M 1/27455; H04M 1/575; H04M 2250/60; H04M 2203/651; H04M 2215/2046; H04M 3/53391; H04M 1/6505; H04M 1/72547; H04M 2203/2011; H04M 3/53316; H04M 3/53366; H04M 7/0045; H04M 3/5141; H04M 3/53; H04M 3/5307; H04M 2203/253; H04M 2203/4509; H04M 2203/4518; H04M 2203/4545; H04M 2203/4563; H04M 2250/74; H04M 7/0048; H04W 4/12; H04W 4/14; H04W 4/18; H04W 4/20; H04W 4/16; H04W 76/10; H04W 80/00; H04W 80/12; H04W 4/21; G06Q 10/101; G06Q 50/01

See application file for complete search history.

(56) References Cited

U.S. PATENT DOCUMENTS

| | | |
|---|---|---|
| 7,221,748 B1 | 5/2007 | Moore et al. |
| 7,317,908 B1 | 1/2008 | Eason |
| 7,596,217 B2 | 9/2009 | Balk et al. |
| 8,121,263 B2 | 2/2012 | Yao et al. |
| 8,274,966 B2 | 9/2012 | Seal et al. |
| 8,345,832 B2 | 1/2013 | Hamaker et al. |
| 8,706,090 B2 | 4/2014 | Boyer et al. |
| 8,805,688 B2 | 8/2014 | Barton et al. |
| 8,914,003 B2 | 12/2014 | Salmon et al. |
| 9,237,214 B2 | 1/2016 | Reitalu et al. |
| 2004/0121761 A1 | 6/2004 | Tripathy et al. |
| 2004/0157606 A1 | 8/2004 | Lee |
| 2005/0013419 A1* | 1/2005 | Pelaez .................. H04M 3/5307 379/88.14 |
| 2005/0020288 A1* | 1/2005 | Davis ................ H04M 3/53308 455/466 |
| 2005/0163289 A1* | 7/2005 | Caspi ...................... H04L 51/36 379/88.13 |
| 2006/0149818 A1* | 7/2006 | Odell .................... G06Q 10/107 709/206 |
| 2007/0116195 A1 | 5/2007 | Thompson et al. |
| 2007/0127631 A1 | 6/2007 | Difiglia |
| 2008/0037726 A1* | 2/2008 | Yao .......................... H04L 51/36 379/88.13 |
| 2008/0317222 A1* | 12/2008 | Griggs .................. A61K 9/2054 379/88.14 |
| 2009/0240488 A1* | 9/2009 | White .................... G06F 3/0236 704/9 |
| 2009/0276215 A1* | 11/2009 | Hager .................... G06F 17/273 704/235 |
| 2010/0268534 A1 | 10/2010 | Kishan Thambiratnam et al. |
| 2011/0028133 A1 | 2/2011 | Roach, Jr. |
| 2012/0094642 A1 | 4/2012 | Popperl et al. |
| 2012/0114109 A1* | 5/2012 | Yao .......................... H04L 51/36 379/88.13 |
| 2013/0045720 A1* | 2/2013 | Madhavapeddl ....... H04W 4/12 455/414.1 |
| 2013/0077769 A1* | 3/2013 | Hamaker .......... H04M 3/53358 379/88.01 |
| 2013/0121481 A1* | 5/2013 | Mikan ..................... H04L 51/10 379/88.14 |
| 2014/0228008 A1 | 8/2014 | Engelhart, Sr. |
| 2015/0340037 A1* | 11/2015 | Kim ........................ G10L 15/26 704/235 |

OTHER PUBLICATIONS

FAQs from InstaVoice [online], [archived on Aug. 26, 2016], Retrieved from the Internet: <URL: https://web.archive.org/web/20160826215242/http://www.instavoice.com:80/faqs.html> (Year: 2016).*

Nickinson, Phil. What you need to know about the new Google Hangouts, Hangouts Dialer, and the old Google Voice [online], [archived on Jan. 26, 2016], <URL:https://web.archive.org/web/20160126111405/http://www.androidcentral.com:80/what-you-need-know-about-new-google-hangouts-and-google-voice> (Year: 2016).*

* cited by examiner

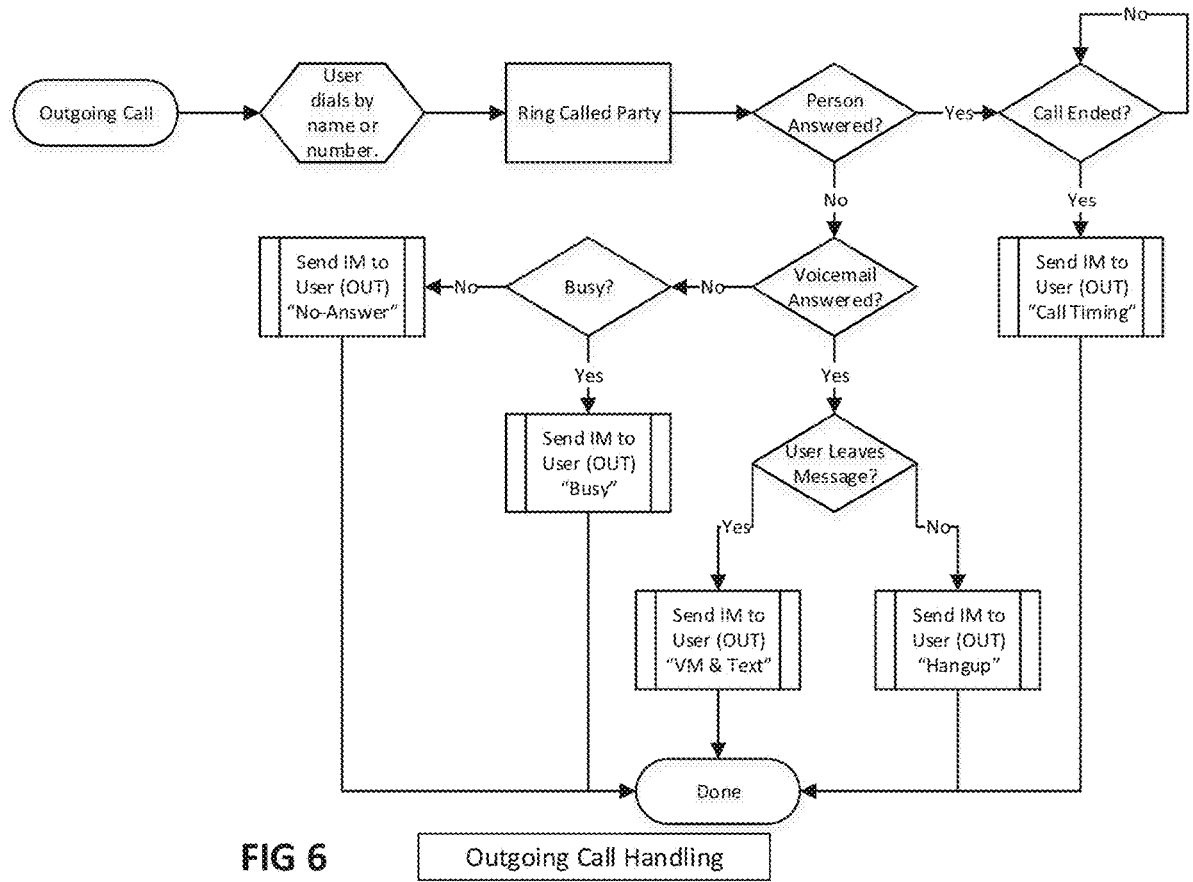
FIG 6 Outgoing Call Handling
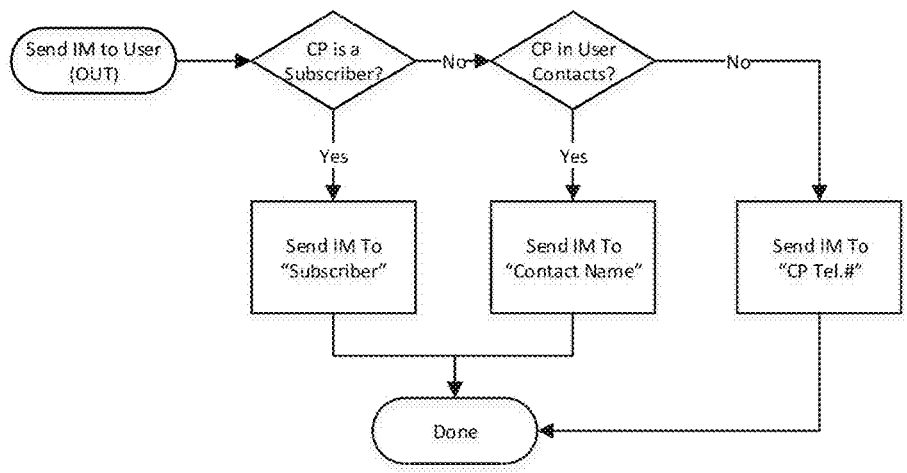
FIG 7 Associating the IM with a Called Party (CP)

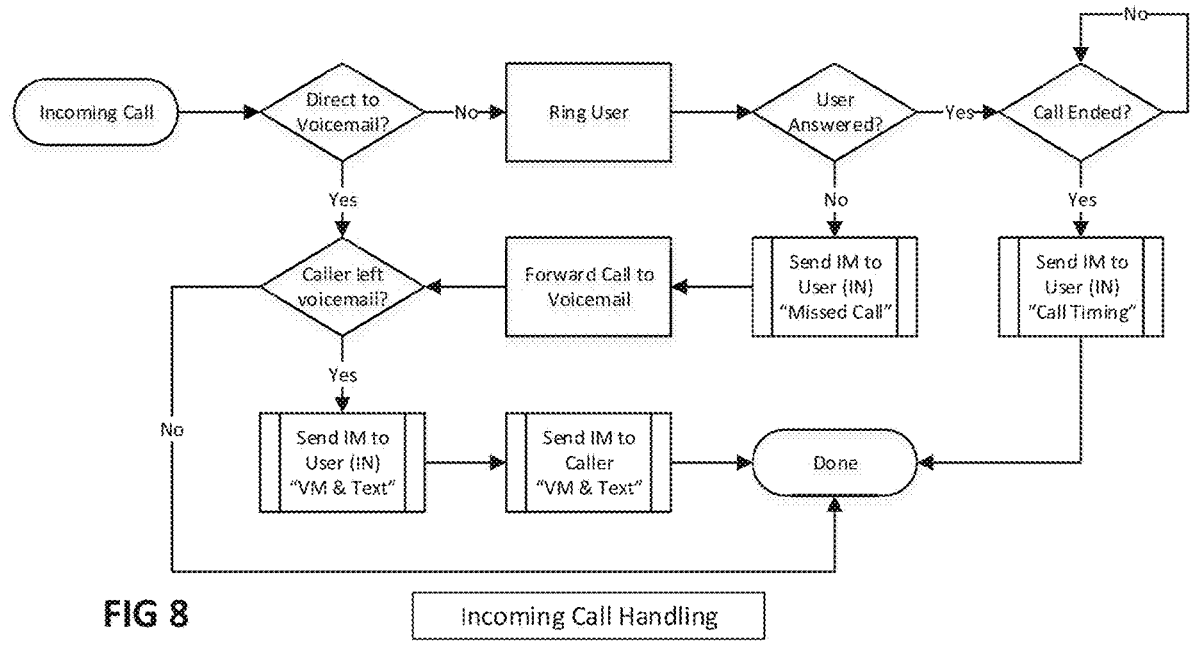
FIG 8  Incoming Call Handling
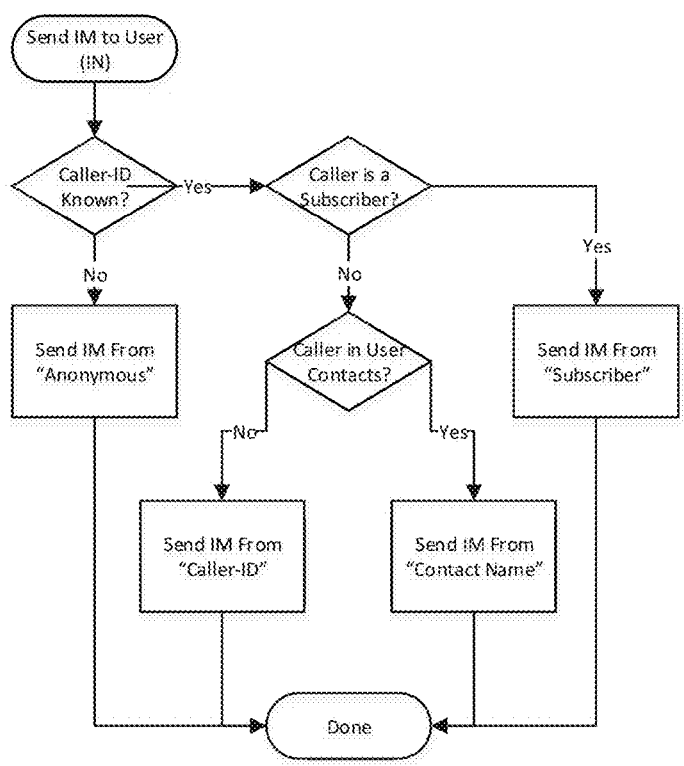
FIG 9  Associating the IM with a Caller Send IM to Caller Creating and Sending a "VM & Text" IM

SYSTEM AND METHOD FOR TRANSFORMING A VOICEMAIL INTO A COMMUNICATION SESSION

CROSS-REFERENCE TO RELATED APPLICATIONS

This application claims benefit or priority from U.S. provisional application 62/455,013, filed on Feb. 6, 2017, which is incorporated herein by reference in its entirety.

BACKGROUND

(a) Field

The subject matter disclosed generally relates to electronic messaging, and more particularly, to methods and systems for initiating communication sessions between electronic devices of different parties.

(b) Related Prior Art

It is becoming common for users to have access to their voicemail in their email or instant messaging inbox. Primarily, this comes in the form of an audio attachment to an email (or instant message) where the audio can be played back when desired.

FIG. 1 illustrates a more advanced approach which includes the audio attachment representing the voicemail in an email application and provides an audio player object, and a reply by chat object which together allow the person receiving the voicemail to listen to the voicemail and reply by writing.

However, with these approaches, the chances of having the email forgotten, ignored or buried in a large list of unread emails, and thus delayed, are very high.

Other attempts have been made to convert voice conversations to text transcriptions so as to provide the benefits of texting (speed, urgency, ability to log and search, etc.) for voice data.

However, the automatic transcription of human speech into text remains a technological challenge. There are various reasons why transcription is challenging, including people speaking with different accents, background noise, telephone audio quality and many others. As a result, telephone message transcriptions often only give the reader the gist of what was said and have relatively low accuracies that limit their usefulness.

Voicemail recipients of existing systems are also limited in their ability to reply to the sender. Existing systems often do not allow reply if the sender does not also have an account on that system (i.e., if they are not already registered users of the platform) or if they do allow such a reply, its delivery is not assured or its non-delivery is not signaled. In addition, when a reply is possible existing systems deliver it in an email which can go unnoticed for a long time, or in an automated telephone call which can go unanswered. As a result, voicemail is a one-way communication and not a conversation where an exchange (i.e., a bi-directional communication) can take place between different parties.

Therefore, there remains a need in the market for a system and method which address the shortcoming of the existing systems.

SUMMARY

The present embodiments provide such a system.

In one aspect there is provided a computer implemented method for establishing a chat session between a first party and a second party, the method comprising: receiving a voice message from the first party which is destined for the second party; transcribing the voice message including transforming the voice message into a text; initiating the chat session between the first party and the second party, including sending the voice message and its transcribed text as a multi-media instant message (IM) to the first party and to the second party, the IM appearing as an outgoing message on a first computing device associated with the first party, and as an incoming message on a second computing device associated with the second party.

In an embodiment, the first party uses a first computing device to record audio which is streamed to a remote transcription server for transcription using a voice-to-text algorithm installed on the remote transcription server, and the transcribed text returned to the first computing device of the first party wherein a multi-media IM, composed of both audio and text is created, addressed to the second party and sent to a remote push server wherein it is sent to the second computing device of the second party over a telecommunications network.

In another embodiment, the second party may reply to the multi-media IM from the first party with another multi-media IM using a second computing device to record audio which is streamed to a remote transcription server for transcription using a voice-to-text algorithm installed on the remote transcription server, and the transcribed text returned to the second computing device of the second party wherein a multi-media IM, composed of both audio and text is created, addressed as a reply to the first party and sent to a remote push server wherein it is sent, over a telecommunications network, to the first computing device of the first party wherein it is displayed as an IM reply.

In yet another embodiment, the first party first makes a call using a first communication device connected to a remote call switch which directs the call to the second party and, after the second party is unable to answer the call, re-directs it to a remote voicemail server that answers and wherein the first party leaves a voicemail which is transcribed, using a voice-to-text algorithm installed on a remote transcription server, and wherein the multi-media IM, composed of both audio and text is created, addressed as a 'received message' to the second party and a 'sent message' to the first party and sent to a remote push server wherein it is sent, over a telecommunications network, to a first computing device of the first party wherein it is displayed as an outgoing IM and a second computing device of the second party wherein it is displayed as an incoming IM.

The method may comprise providing the text in an editable format on the computing device of the sending party prior to sending the IM; and sending the IM to the receiving party upon receiving a user input to send, whereby the edited text can be sent as amendment following the multi-media IM being sent to the receiving user.

The method further comprises sending and receiving the audio file representing the transcribed voice message along with the text transcription as a single indivisible multi-media IM object. This ensures that in cases where transcription inaccuracies occur, the recipient can get the gist of the message from the transcribed text but can listen to the audio for its exact content.

According to an embodiment, sending the multi-media instant message (IM) to the first party and to the second party comprises sending the multi-media instant message (IM) to at least one of: more than one computing device associated with the first party; and more than one computing device associated with the second party.

In another aspect of the invention, there is provided a system for establishing a chat session between a first party and a second party, the system comprising a remote server to which an electronic device of the first party subscribes, the remote server receiving a voice message from the first party which is destined for the second party; the remote server executing instructions for transcribing the voice message including transforming the voice message into a text, the remote server initiating the chat session between the first party and the second party, including sending the text and audio as a multi-media instant message (IM) to the first party and to the second party, the IM appearing as an outgoing message on a first computing device associated with the first party, and as an incoming message on a second computing device associated with the second party.

According to an embodiment, the remote server comprises a single server for recording the voice message and transcribing the voice message to the text.

According to an embodiment, the remote server comprises a voicemail server for recording the voice message and a transcription server in communication with the voicemail server for transcribing the voice message to the text.

According to an embodiment, the remote server comprises a plurality of servers operating in a network for recording the voice message and transcribing the voice message to the text.

In another aspect of the invention, there is provided a method for integrating a voice message into a chat session between a first party and a second party, the method comprising:
  receiving, at a remote server, a voice message from the first party which is destined for the second party;
  transcribing the voice message including transforming the voice message into a text; and
  forwarding to the chat session between the first party and the second party, a multi-media instant message (IM) including the text and an audio record of the voice message, the IM appearing as an outgoing message on a first computing device associated with the first party displaying the chat session, and as an incoming message on a second computing device associated with the second party displaying the chat session.

According to an embodiment, the audio is recorded on the first computing device and streamed over a telecommunications network to be transcribed using a voice-to-text algorithm installed on the remote server, then the IM is sent as a new message to the second computing device over a telecommunications network.

According to an embodiment, the voicemail is transcribed using a voice-to-text algorithm installed on a remote server and wherein the IM is sent to the first computing device and to the second computing device over a telecommunications network.

According to an embodiment, the method further comprises:
  before forwarding the IM to the chat session, sending the text to the first computing device associated with the first party and instructing the first computing device to present the text in an editable format on the first computing device;
  recording edits on the text by the first computing device and sending the text as edited to the remote server; and
  sending the IM to the second electronic devices associated with the second party immediately followed by the text as edited.

According to an embodiment, sending the multi-media instant message (IM) to the first party and to the second party comprises sending the multi-media instant message (IM) to at least one of: more than one computing device associated with the first party; and more than one computing device associated with the second party.

According to an embodiment, the method further comprises sending a multi-media file comprising the voice message along with the text, thereby the IM is comprised of both audio and transcription text, indivisible.

As will be realized, the subject matter disclosed and claimed is capable of modifications in various respects, all without departing from the scope of the claims. Accordingly, the drawings and the description are to be regarded as illustrative in nature and not as restrictive and the full scope of the subject matter is set forth in the claims.

BRIEF DESCRIPTION OF THE DRAWINGS

Further features and advantages of the present disclosure will become apparent from the following detailed description, taken in combination with the appended drawings, in which:

FIGS. 6-11 are workflows illustrating outgoing and incoming call handling accomplished by the remote call switch, the remote voicemail server and the remote transcription server;

It will be noted that throughout the appended drawings, like features are identified by like reference numerals.

DETAILED DESCRIPTION

There is described a system and a method for establishing a chat session between a first party and a second party. The method comprises receiving, at a remote chat session establishment (RCSE) server, a voice message from the first party which is destined for the second party. The server transcribes the voice message, which involves transforming the voice message into a text. The server then initiates the chat session between the first party and the second party, by sending the text and audio as a multi-media instant message (IM) to the first party and to the second party. The IM appears as an outgoing message on the client interface of a first computing device associated with the first party, and as an incoming message on the client interface of a second computing device associated with the second party. Each party can have more than one device, and the message can be displayed similarly on the other devices associated to the same party.

In a non-limiting example of implementation, the embodiments describe a system, a method, and an interface for facilitating a communication session between two parties by integrating voicemail, chat, calling and call logs. The chat log may be displayed on a mobile device or other chat capable device. The system makes use of a chat session to log entries for connected calls, missed calls, voicemail and chat messages between a first party and a second party. The transcribed chat message and any replies or follow ups thereto appear as the latest entries in the chat log of both parties.

According to an embodiment, when a first party wishes to communicate with a second party using voice calling and leaves a voicemail for the second party, the voicemail is converted to text (instant message or IM) and the text is delivered (with the audio message) to the second party as a new incoming chat message within a chat session, creating one if none already exists. Whereby, if the second party is in a meeting or cannot answer the call for a given reason they would be able to know what the call is about by glancing at the chat message text to get a gist of what the caller said or by listening to the attached audio and can immediately reply thereto if they desire to do so.

The present invention will be more readily understood by referring to the following examples which are given to illustrate the invention rather than to limit its scope.

Figure 1:
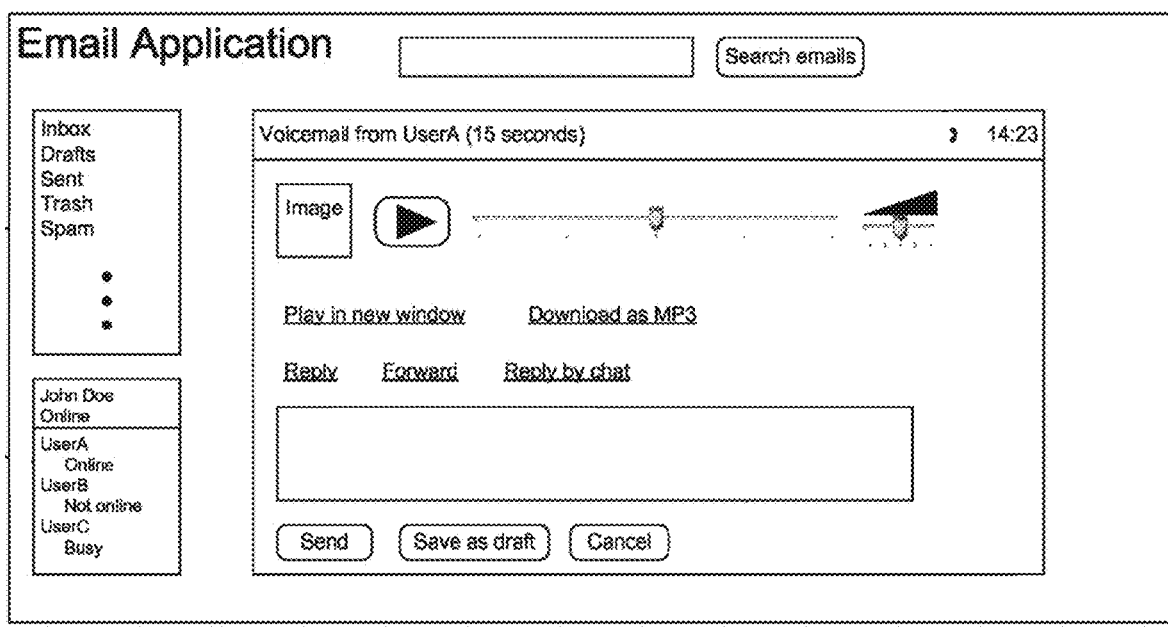
FIG. 1 is a screenshot illustrating a user interface for implementing a conventional method for sending the voicemail to the receiving party, according to the prior art.
Figure 2:
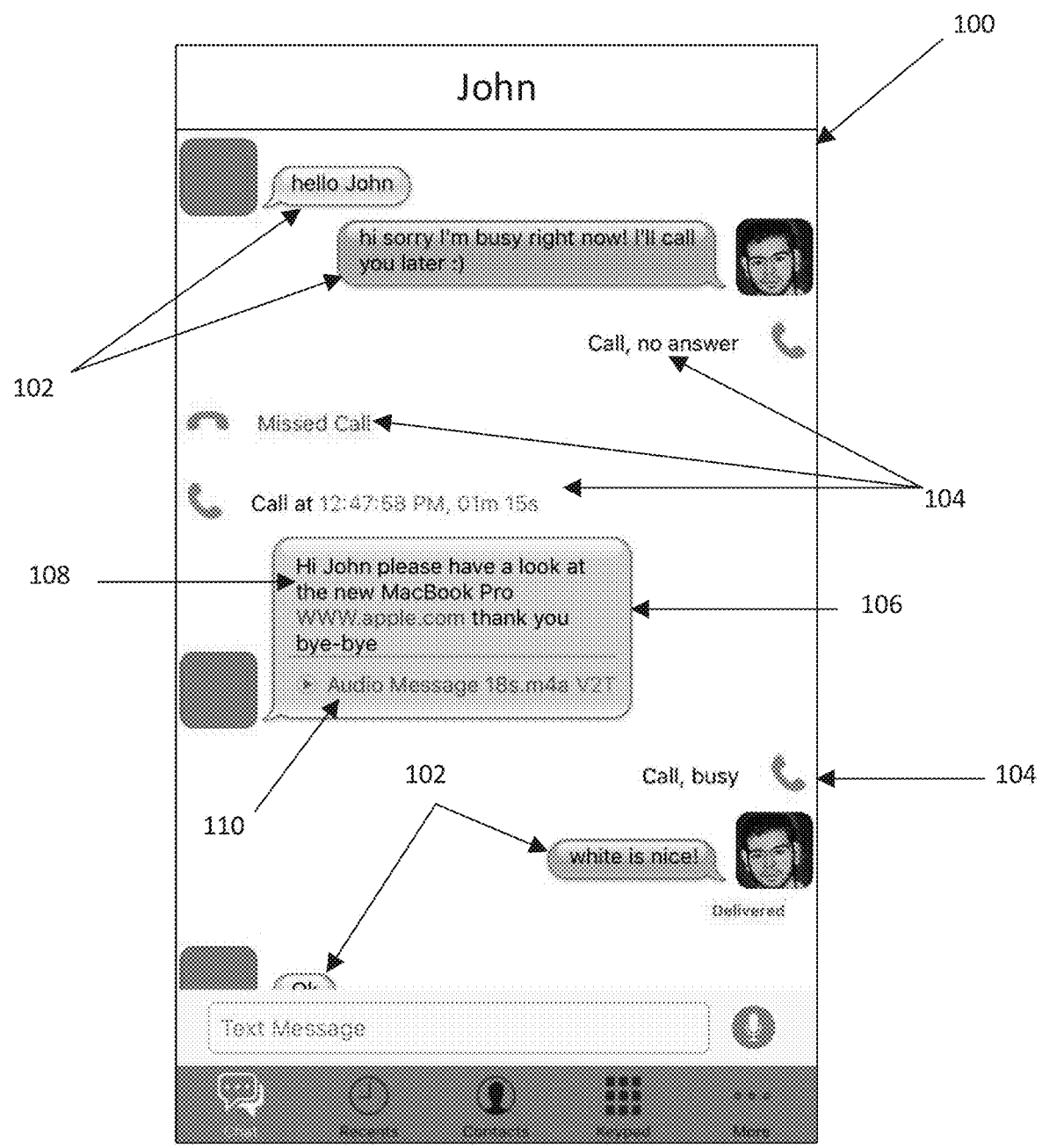
FIG. 2 is an example of a screenshot of a display device (user interface) illustrating a chat session in accordance with an embodiment.

FIG. 2 is an example of a screenshot of a display device (the screenshot showing the user interface as displayed on the display device) illustrating a chat session in accordance with an embodiment. The exemplary chat session 100 of FIG. 2 includes log entries for exchanged text messages 102, calls 104, voicemails 106, etc. The log entries are visible to the users who can see easily the history of communications or communication attempts between he/she and the other user. As shown in FIG. 2, the log entry 106 for the voicemail includes a transcribed text portion 108 representing the text spoken by the first party in the voicemail left for the second party, as generated by the method using voice-to-text algorithms, and an audio portion 110 including an audio file representing the voicemail itself. The audio file may be played to hear the voicemail within the chat session, whereby, the chat session can summarize the entire communication between two parties, be it verbal, text, or unanswered calling attempts. The presence of the audio file is visible in the user interface of both users. Both of them can independently select the voicemail for playback on their own device.

This is advantageous in comparison with prior art systems which, for example, even when replies are possible, do not provide the sender with a copy of their original voicemail so they have no record of the full conversation.

In an embodiment of the invention, calls between the first party and the second party may be recorded, and the recording along with its transcription can be delivered in the chat session created between the two parties, as for the voicemails as described above. This can be implemented in a particular embodiment, or can also be chosen by the users via a configuration portal they can access to select this option.

Figure 3A:
FIGS. 3a and 3b illustrate an exemplary chat session as it appears on the display devices associated with both the first party and the second party, in accordance with an embodiment.
Figure 3B:

The transcribed voice message appears as an outgoing message in the chat session as it appears on the first party's side and as an incoming message in the chat session appearing on the second party's side. For example, the user interface can be divided in two columns, where the left one is for incoming communications and the right one is for outgoing communications, where every communication (incoming and outgoing) is shown together on the same interface. Therefore, the chat session 100 mirrors the same log entries on the first party's side and on the second party's side with the exception that what is incoming on the one side will appear as outgoing on the other side and vice versa, as exemplified in FIGS. 3a and 3b. FIGS. 3a and 3b illustrate a chat session as it appears on the display devices associated with both the first party and the second party (for the case when both parties are subscribers and have the app installed—other cases are described herein). As exemplified in FIGS. 3a and 3b the different communication entries are chronologically logged on both sides of the chat session and mirrored in a way that an incoming log entry for one side corresponds to an outgoing log entry on the other side.

In a non-limiting example of implementation, the system may allow the first party initiating the voice message to make amendments to the transcribed message to avoid any transcription errors introduced by the voice-to-text algorithm/program used for transcribing the voicemail into text. This can be done within the same user interface as the one presenting the communication log, i.e., by selecting the text of the voicemail in the "outgoing" section of the user interface, the sender of the voicemail can open an on-screen keyboard and transform the text to amend in an editable format in which the text can be edited using the keyboard.

Figure 4A:
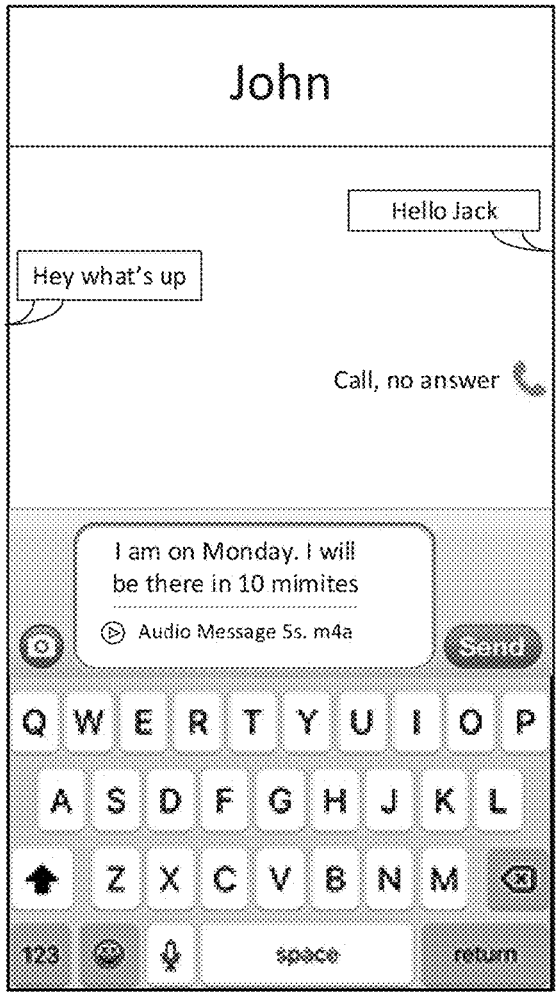
FIG. 4a illustrates the instant message as transcribed in an editable format and ready to be sent, in accordance with an embodiment.
Figure 4B:
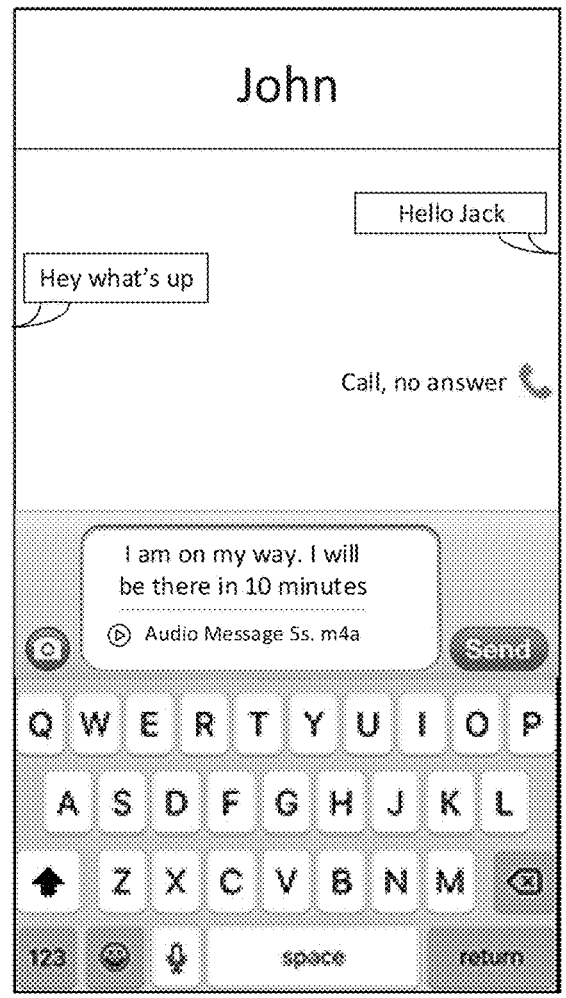
FIG. 4b illustrates an amended version of the message of FIG. 4a, in accordance with an embodiment.

In one example, the amendments may be made by the first party prior to sending the message to the second party, whereby, after dictating the voicemail (aka voice message), a new chat message (aka instant message) is created on the first party's portable device in the chat session having the second party as destination and having the transcribed message in editable format ready to be sent upon pressing a send button. This allows the first party to make amendments to the text prior to sending the message to the second party, as exemplified in FIGS. 4a and 4b. FIG. 4a illustrates the instant message as transcribed in an editable format and ready to be sent, and FIG. 4b illustrates an amended version of the message wherein the expression "Monday. I will be there in 10 mimites" introduced by the voice to text algorithm in FIG. 4a have been amended to read "my way. I will be there in 10 minutes" in the FIG. 4b prior to sending.

Figure 5:
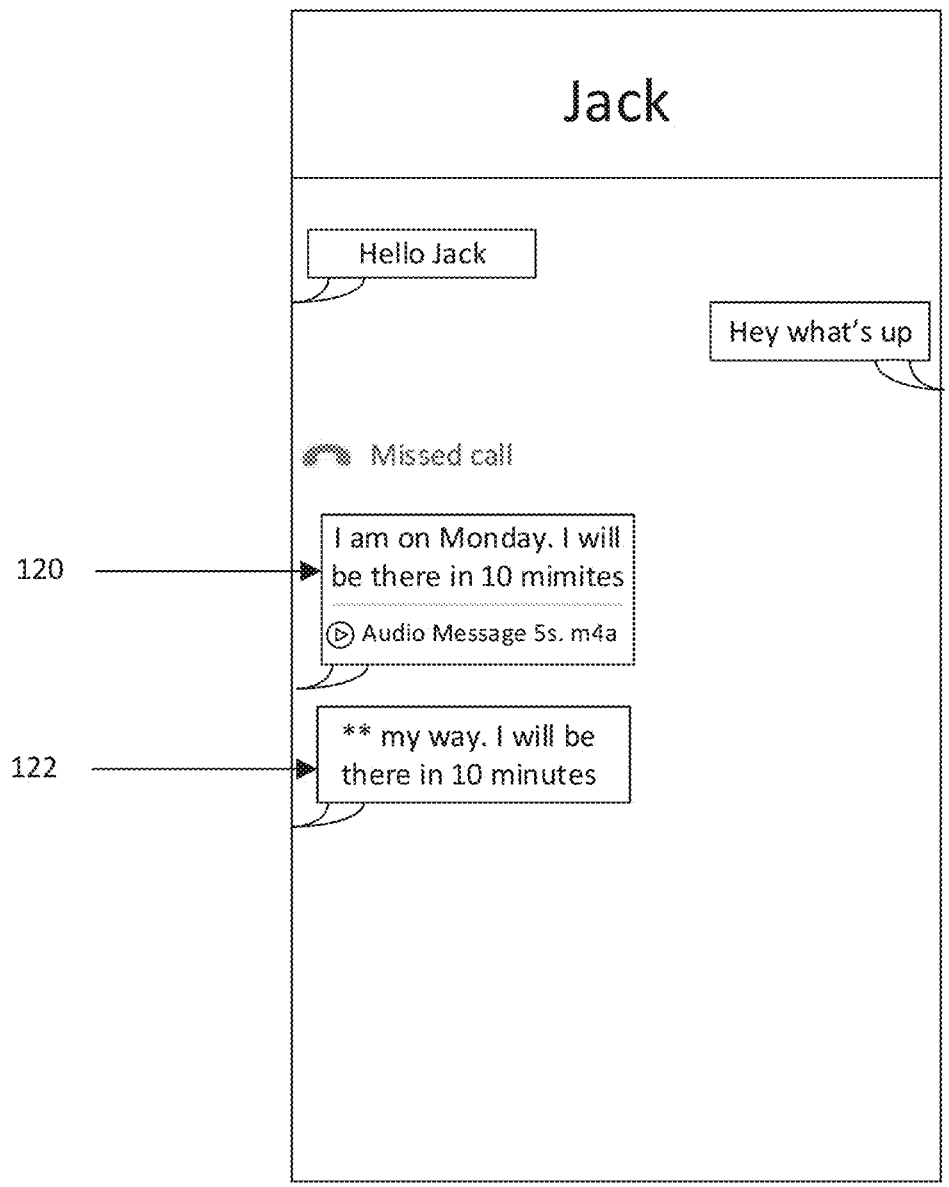
FIG. 5 which shows the transcribed message as received and the correction message that followed, in accordance with an embodiment.

When amendments are made by the first party, the amended text is sent as a second text message after the multi-media message is sent to the second party, whereby the multi-media IM contains the audio and original transcribed text so that the multi-media IM object is always composed of audio and its corresponding transcription. This ensures that the gist of the audio is conveyed by transcribed text (if the text of the transcription is clear enough) and without alteration by sender. By reading the transcribed message "as sent", the first party (i.e., the sender) may make the necessary modifications to the text and these will be sent as one or more follow-up messages correcting the content of the transcribed message "as sent". An example is shown in FIG. 5 which shows the transcribed message 120 as received and the correction message 122 that followed (as seen on the portable device of the second party aka receiving side).

In an embodiment, the system may be configured to perform decisions on speaker language based on various factors such as computing device localization, default sender language setting on the device, default recipient language, sender/receiver communication history, etc., in order to improve the quality of the transcription. This allows the voice-to-text algorithm to be personalized to the associated user to accommodate for different accents, dialects, and other voice and language components, whereby the quality of the transcriptions will improve to reduce the errors, particularly in multi-lingual situations.

In one aspect, the method may be offered as service to its subscribers, whereby, to be practiced, at least one of the first party and the second party must be a subscriber of the service. In a non-limiting example, the method may be implemented as a dedicated application that at least one of the first party and the second party must have on their computing/portable device (e.g., a smartphone) used to make phone calls. A remote server can be used to store a downloadable version of the application that any user can access to download remotely the application and install it on its own electronic device. This server can be the same or can be different from the application server(s). In other cases, the application or the features of the application described herein can be already programmed in the operating system of the electronic device. A user can be considered to be a subscriber in both cases, such that the features described herein can be implemented, because transmittal of communication to or via the application server(s) is made possible by this subscription.

The application server(s) include the voicemail server, to which communications can be redirected by the on-phone application of a subscriber (the subscriber being either recipient or sender) for voicemail recordation or even phone call recordation. The application server(s) also include the transcription server, which transcribes voice (voicemail, real-time phone calls) to text (or alternatively generates computer-generated voice from a text such as a SMS). The application server(s) can be a single server, or two distinct servers, or a plurality of servers operating in a network (including cloud computing, for example).

Therefore, different configurations are implemented depending on whether the subscriber is the first party initiating the call, the second party receiving the call, or both. The following embodiments will discuss these different scenarios.

As an example, if a non-subscriber caller reaches a subscriber's voicemail and leaves a voice message, the voice message will be redirected by the subscriber's electronic device to the application server and will be transcribed and sent, by the application server, to both the subscriber and the caller as an instant message. The IM may come in the form of chat for the subscriber using the subscription service's application and as an SMS/MMS message for the caller who does not have the application installed on their device. This opens up a chat session between them regardless of whether the caller is a subscriber or not. In the case of SMS/MMS delivery to a non-subscriber, due to SMS/MMS limitations, the non-subscriber will see this as an incoming message, rather than outgoing. As a compensation for this issue, the message is presented within a context that explains to the caller that this is the message they left for the subscriber.

Similarly, if a subscriber using the subscription service's application calls a non-subscriber and reaches their voicemail and leaves a voice message, the service will record the message, transcribe it to a text and send to both the subscriber and the called party as an instant message. The IM comes in the form of chat for the subscriber using the subscription service's application and an SMS/MMS message for the called party who does not have the application. This opens up a chat session between them regardless of whether the called party is a subscriber or not. The called party's voicemail system may also deliver a copy of the message to the called party using whichever mechanism that system employs.

If the SMS/MMS number of the non-subscriber is not known by the system, it discovers it by examining the non-subscriber's contact details in the subscriber's contacts directory, and/or by attempting to match the non-subscriber's called number when the call is initiated, and/or by using a Calling Line Identification (CLID) when calling. If a determination is still not possible, the system shall try to determine it using any means allowed by technology. For example, it may use an API that detects if a number is a landline or a mobile phone number, or it may ask the subscriber to specify it. If a determination is still not possible, the system may send the SMS/MMS to the known non-subscriber phone number and ask for a confirmation reply in the hope the non-subscriber's phone number is SMS enabled.

If a subscriber calls another subscriber and reaches their voicemail and leaves a voice message, the service will record the message, transcribe it and send to both subscribers as an instant message. In one embodiment, where both subscribers use the subscription service's application, the IM may come in the form of in-app chat for both subscribers. The subscriber leaving the message will see it as an outgoing chat message while the other subscriber will see it as an incoming chat message. This opens up a chat session between them even though one of them is not a subscriber.

If a first party calls the second party but the call is not answered by the second party, whether answered by voicemail or the first party hangs up, the method logs a 'missed call' entry 104 as a chat message from the other party within a chat session 100 between both parties as exemplified in FIG. 2. However, if the first party calls the second party and the call connects, the method logs an 'outbound call' entry as a chat message to the first party and an 'inbound call' entry as a chat message to the second party, within the chat session between both parties.

The first party may be able to send additional chat messages and reply to chat messages from the second party by typing text or recording speech, which is converted to text, the text delivered, along with the audio if applicable, as a new chat message within the chat session. For example, audio may be recorded on the instant messaging client interface on the electronic device of the recording party. The second party may be able to reply to the chat message and send additional chat messages to the first party using text or speech, the speech converted to text and the text delivered along with the audio if applicable, to the first party as a reply within the same chat session.

Accordingly, a communication session starts with either an outgoing connection or an incoming one. These two cases are outlined below.

Case 1) Outgoing connection: a subscriber can call, message or text another party. FIG. 6 is a flowchart of a method for directing outgoing calls in accordance with an embodiment.

1.A) To call a party that is not on the service (i.e., not a subscriber), a subscriber simply enters the phone number of this non-subscriber party, or selects them from the Contact Directory and clicks the 'Call' icon. As exemplified in FIGS. 2, 3a and 3b, the call attempt may be logged in the subscriber's chat dialog associated with the called party once the call ends whether answered or the caller hangs up without an answer. The entry may appear as an IM from the User to the Called Party. The entry may be made at the end of the call if it was answered and may indicate the start time and duration of the call. If the call is not answered, the entry may be made as soon as the user hangs up and may indicate a 'busy' or 'no answer' status as the case may be. The Called Party associated with the chat dialog may be identified by name if they are in the Contact Directory or phone number if they are not. If the number is not in the Contacts Directory the subscriber may be offered the option to add it and specify a name.

1.A.i) If the call is answered by the called party, the subscriber may select the 'Record' option if not enabled by default. The service may then start recording and transcribing the real-time continuous bidirectional conversation. The recorded segments may appear in the chat log.

1.A.ii) If the call is to a non-subscriber and answered by voicemail, the subscriber may select the 'Message' option if not enabled by default. The service may start recording the subscriber's message. Depending on the subscriber's preferences, the service may first hang-up on the non-subscriber's voicemail system so that the message is not recorded by that system.

1.A.iii) At the end of the call, the service may transcribe the message and send it to the subscriber via chat. If the called party is not a subscriber the transcribed message may be sent to them via SMS/MMS. A new chat entry in the subscriber's chat log may also be made indicating the start time of the call and its duration.

1.B) To message another party, the subscriber simply enters their phone number or selects them from the Contact Directory, then click the 'Message' icon using the application. The chat session may open and the user can start recording the subscriber's message. Transcription may be done and displayed as the recording proceeds. When finished recording, the subscriber hits the send button and the message along with the transcription may appear in their chat log as a sent entry. If the other party is not a subscriber the service may send them via SMS/MMS to the other party.

1.C) To text another party, the subscriber simply enters their phone number or selects them from the Contacts Directory then click the 'Chat' icon using the App. The chat session may open and the user can start texting the subscriber's message. When finished texting, the subscriber hits the send button and the text may appear in their chat log as a sent entry. Optionally, the service may compose the audio equivalent of the text using a text-to-speech program and include the generated audio file with the text. If the other party is not a subscriber the service may send the text and audio, if enabled, via SMS/MMS to the other party.

Case 2) Inbound connection: a subscriber can receive a call, message or text. FIG. 8 is a flowchart of a method for directing incoming calls in accordance with an embodiment.

2.A) To call a subscriber, a calling party simply dials the subscriber's service phone number or messaging phone number manually or by selecting the subscriber from a Contact Directory. When the service number is called, an indication of an incoming call may be logged in the subscriber's chat dialog associated with the caller. The entry may appear as an IM from the caller to the user. The entry may be made at the end of the call if it was answered by the subscriber and may indicate the start time and duration of the call. If the call is not answered by the subscriber, the entry may be made as soon as it is answered by voicemail and may indicate a 'missed call'. The calling party associated with the chat dialog may be identified by name if they are also a subscriber or if their calling number is in the user's Contact Directory. If a name associated with the calling number cannot be determined, then the number is used. If the calling number is not known then the entry is made in a session associated with anonymous callers. The 'anonymous caller' session is special in that it is only for one-way communication coming to the user from unknowns. The user cannot reply to messages in the anonymous chat session. If the number is known and not in the Contact Directory the user may be offered the option to add it and specify a name.

2.A.i) If the call is answered by the subscriber, the subscriber may select the 'Record' option, if not enabled by default. The service may then start recording and transcribing the conversation. The recorded segments may appear in the chat log.

2.A.ii) If the call is answered by the subscriber's voicemail, the other party may leave a message. When finished recording, the service may transcribe the message and send it to the subscriber's chat log. Optionally, instead of transcribing when the recording is finished, the service may transcribe it and send chat entries to the subscriber's chat log in near real-time. The subscriber can in effect read/listen to the message being left as it is being left and the option to 'Answer' would be provided.

2.A.iii) At the end of the call, the service may transcribe the message and send it to the Subscriber via Chat if real-time logging was not enabled, and to the calling party if they are not a subscriber via SMS/MMS if their SMS number is known. A new chat entry in the subscriber's chat log may also be made indicating the start time of the call and its duration.

2.B) When a subscriber wishes to message another subscriber, the workflow is described in 1.B above. When a non-subscriber wishes to message a subscriber, they simply dial the subscriber's messaging phone number. The messaging phone number is answered directly by the voicemail service without ringing the subscriber's phone. Provided caller identification information is available on the call (i.e., if it is not an anonymous caller) it may be used to associate the chat dialog with the calling party's name if they are in the Contact Directory, or their number if they are not. If the number is not in the Contact Directory it may be added and an option to specify a name may be presented to the subscriber.

2.C) When a subscriber wishes to text another subscriber, the workflow is described in 1.C above. When a non-subscriber wished to text a subscriber, they simply send an SMS to the subscriber's Messaging phone number which is SMS-enabled. The service may receive the text, create the audio equivalent of the text using text-to-speech and send it via chat to the chat log of the subscriber associated with the sender.

The system/method may further provide the ability to obtain from the first party availability information indicating when they may be available for a call if necessary and upon delivery of the chat message to the second party obtaining from the second party their availability information.

The system/method may further obtain availability via options selectable in the display of the chat session, via query of the parties' calendar and via interactive voice response.

The system/method may further provide each party with information about the other party, including name, telephone number and availability and provides either party with the ability to call the other party. The system may further include the ability to schedule a call at a time agreeable to both parties and to have the system automatically call both parties and connect the call.

The system/method may further provide the option to include the recording and text transcription of the audio of connected calls between the two parties and logging these calls within the chat session.

When viewing the chat log the party has the option to filter by entry type so all entries are displayed or only entries of selected types (connected calls, missed calls, voicemail and chat) are displayed.

Figure 10:
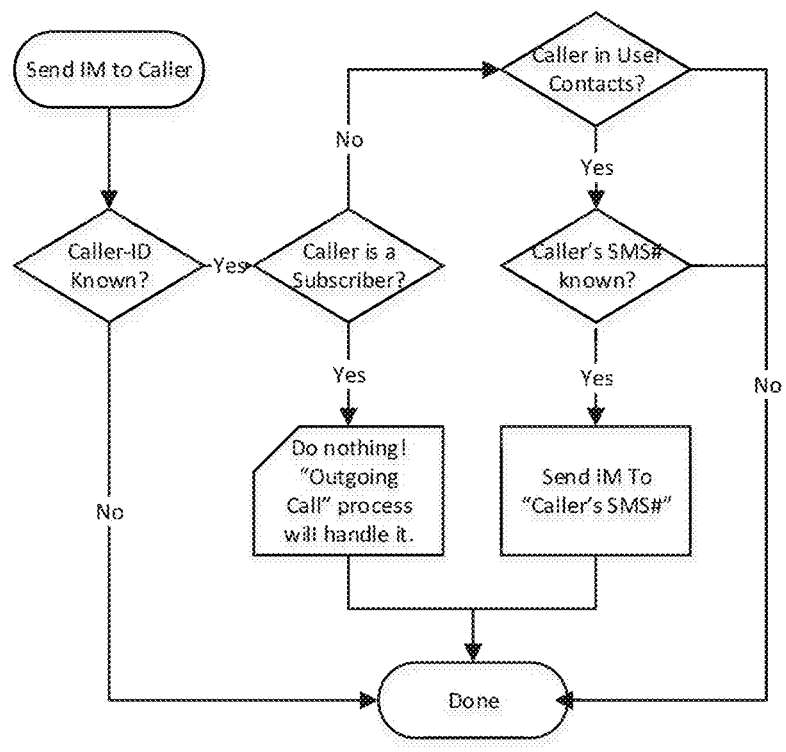

FIGS. 7, 9 and 10 provide flowcharts of methods for sending IM to users and callers in accordance with an embodiment.

FIGS. 6 and 8 are flowcharts of methods for directing outgoing and incoming calls in accordance with an embodiment.

Figure 11:
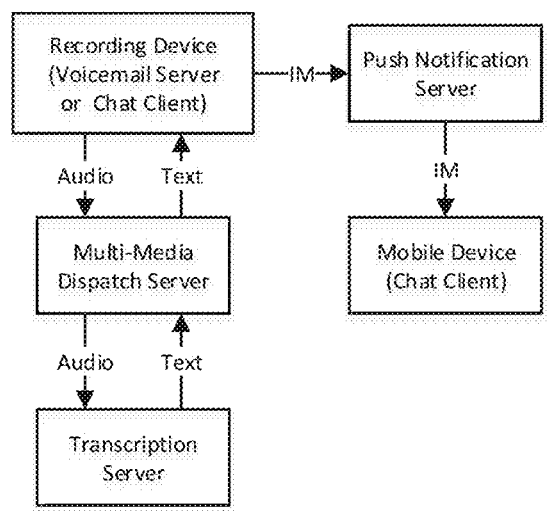

FIG. 11 provides a high level message flow diagram showing where the audio is transcribed and other service elements involved in creating a multi-media IM and sending it to the mobile device where a chat client receives it and displays it in the appropriate chat session.

Figure 12:
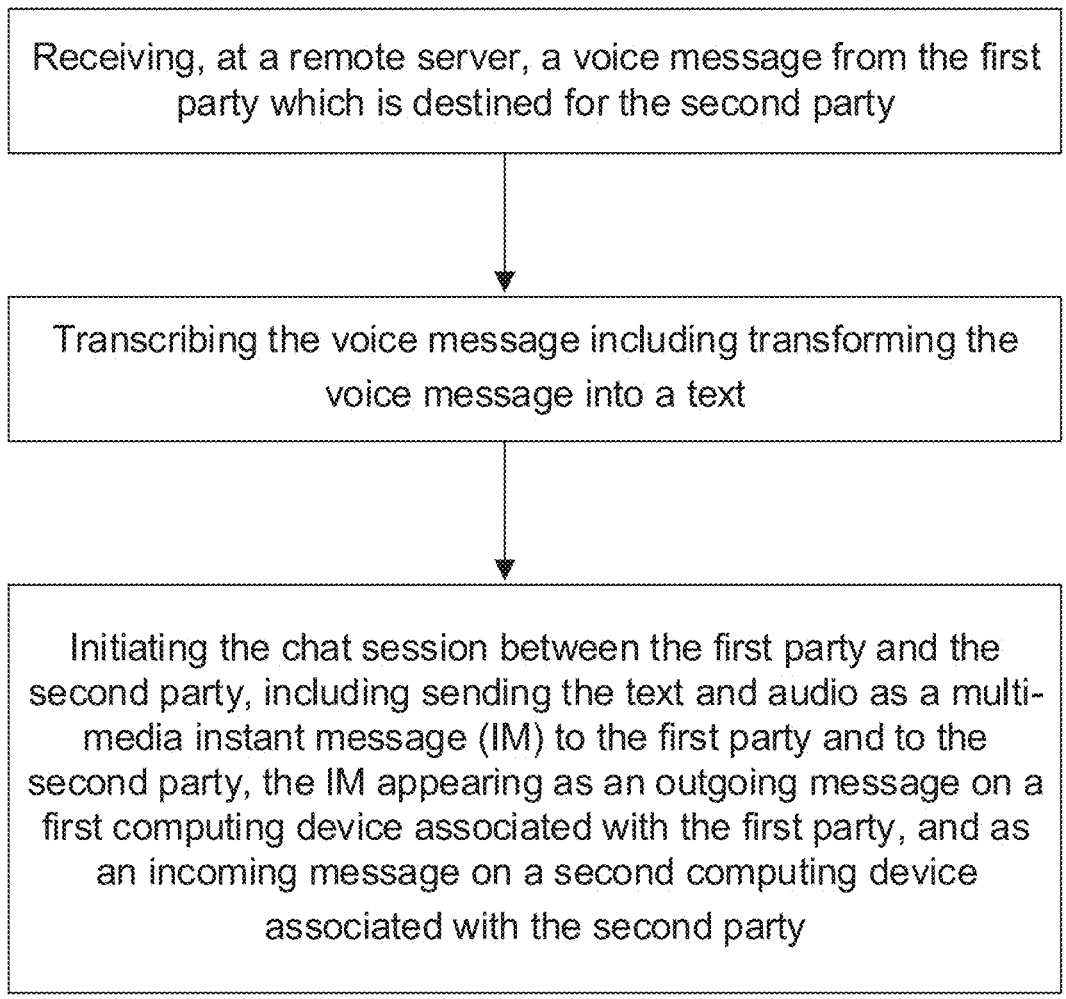
FIGS. 12-13 are workflows illustrating embodiments of a method for initiating a chat session between a first party and a second party.
Figure 13:
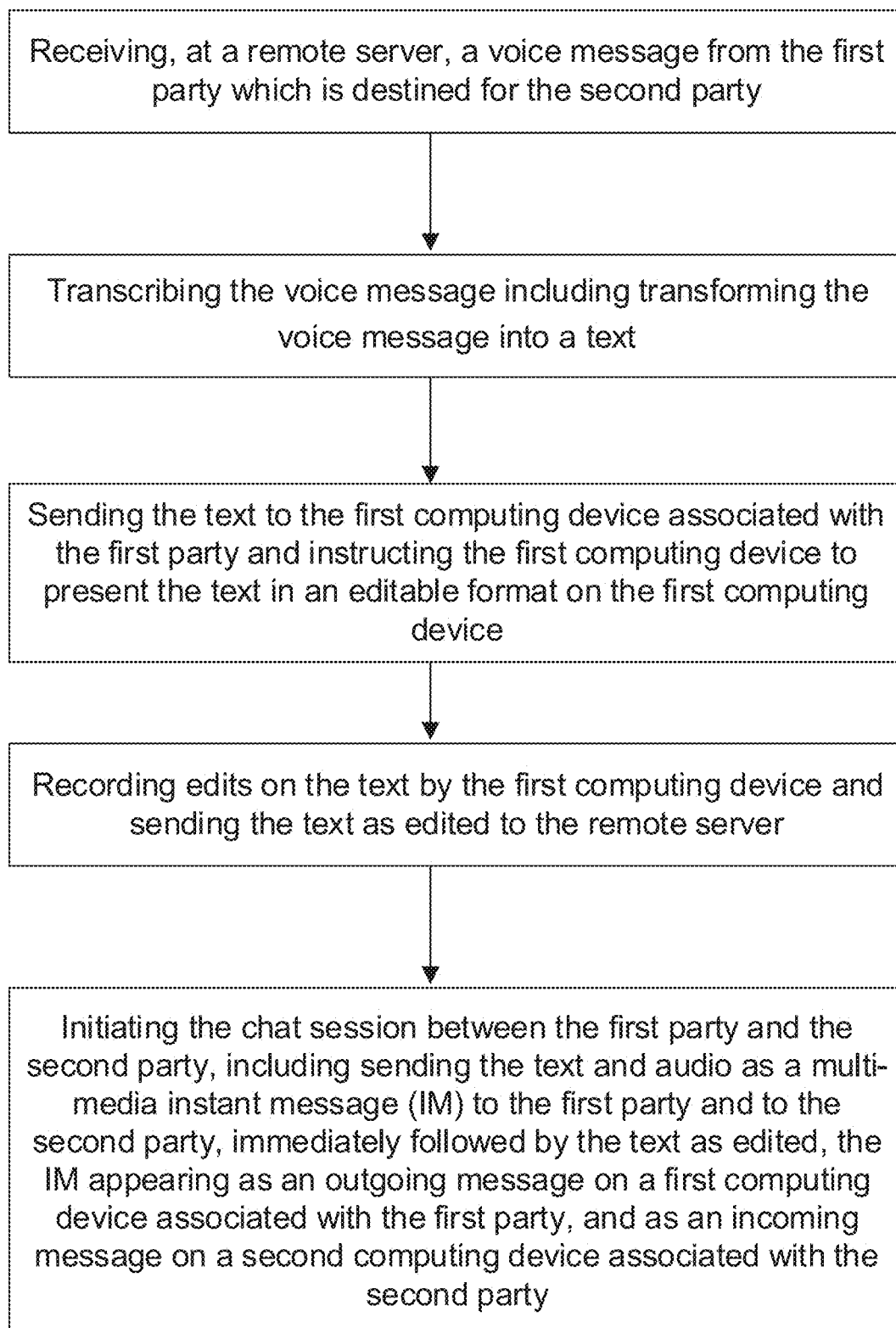

FIGS. 12-13 are workflows illustrating embodiments of a method for initiating a chat session between a first party and a second party, respectively without and with text edition of the transcription.

Figure 14:
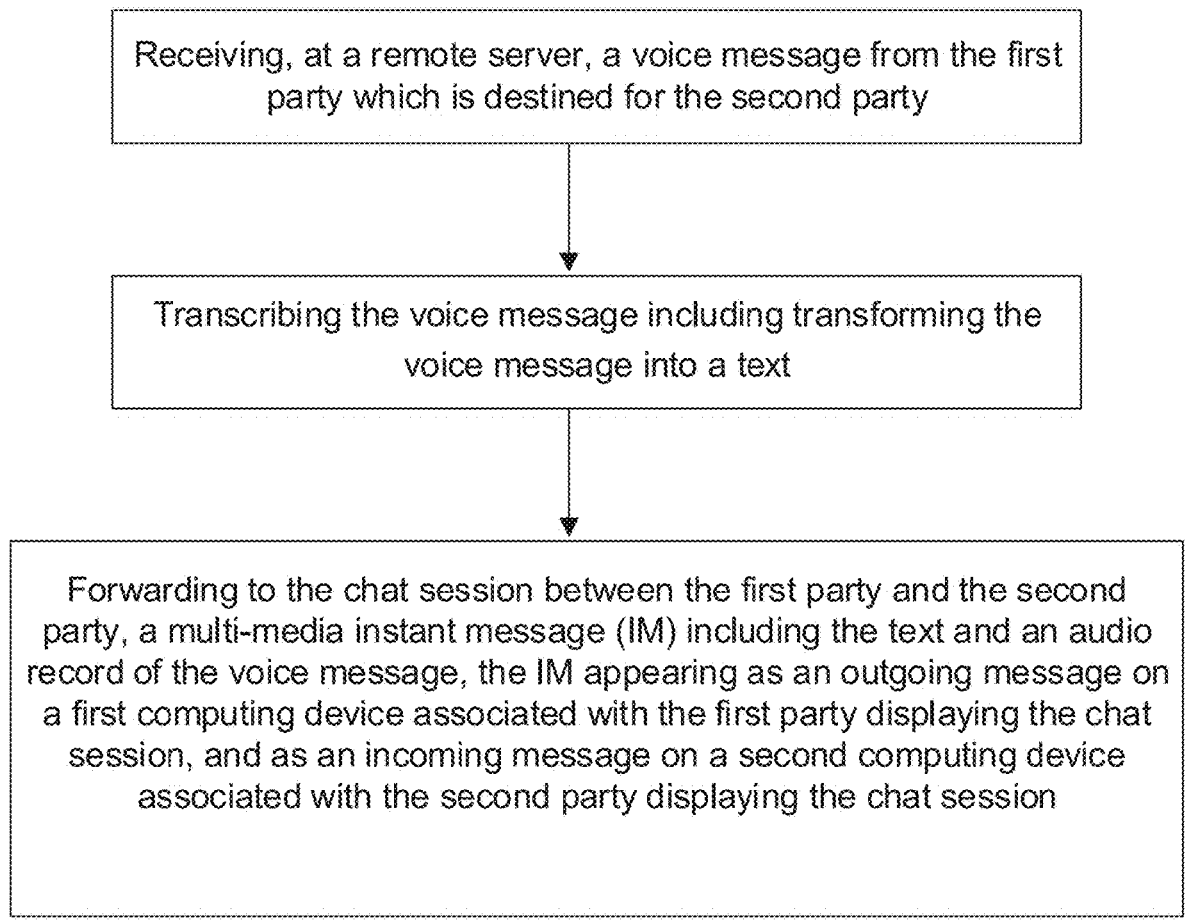
FIGS. 14-15 are workflows illustrating embodiments of a method for forwarding an instant message to a chat session between a first party and a second party.
Figure 15:
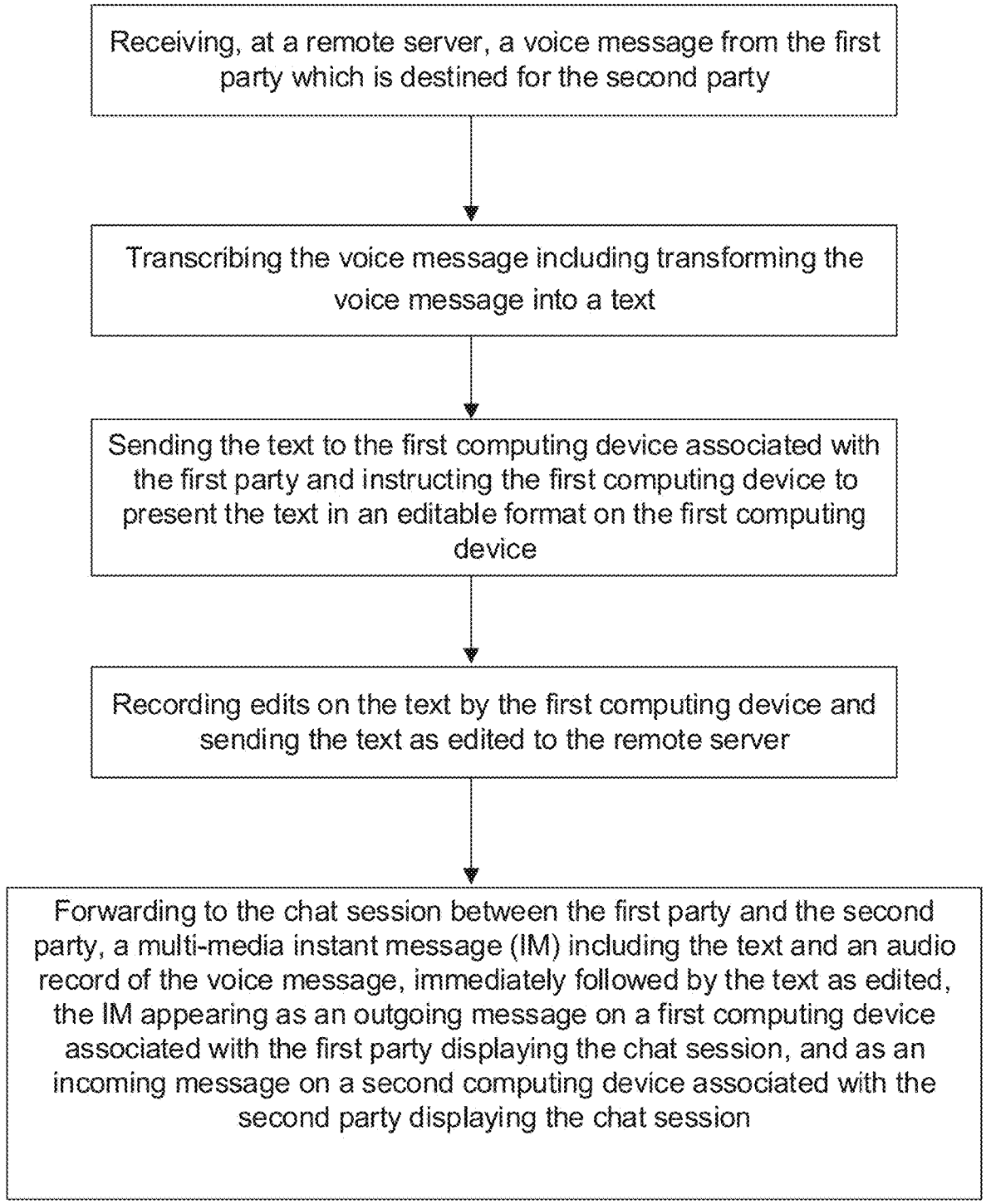

FIGS. 14-15 are workflows illustrating embodiments of a method for forwarding an instant message to a chat session between a first party and a second party, respectively without and with text edition of the transcription.

While preferred embodiments have been described above and illustrated in the accompanying drawings, it will be evident to those skilled in the art that modifications may be made without departing from this disclosure. Such modifications are considered as possible variants comprised in the scope of the disclosure.

Examples of these modifications include the bridging of the 2-way communication session between a first party and a second party using different instant messaging clients.

The invention claimed is:

1. A computer implemented method for transforming a voice message into a communication session between a first party and a second party, the method comprising:
   receiving, at a remote server, a voicemail from the first party which is destined for the second party, the voicemail being recorded by the first party when a call to the second party is not answered or not made;
   transcribing the voicemail including transforming the voicemail into a text; and
   sending the text and audio as a multi-media instant message (IM) to the first party and to the second party to establish a chat session between the first party and the second party, the IM being sent to more than one computing device associated with the first party and/or more than one computing device associated with the second party, the IM appearing as an outgoing message in a first chat window on one or more computing devices associated with the first party, and as an incoming message in a second chat window on one or more computing devices associated with the second party.

2. The method of claim 1, wherein the voicemail is transcribed using a voice-to-text algorithm installed on the remote server.

3. The method of claim 2, further comprising:
   before initiating the chat session, sending the text to the computing devices associated with the first party and instructing them to present the text in an editable format;
   recording edits on the text by a first computing device associated with the first party and sending the text as edited to the remote server; and
   sending the IM to the computing devices associated with the second party immediately followed by the text as edited.

4. The method of claim 1, wherein the audio is recorded on a first computing device associated with the first party and streamed over a telecommunications network to be transcribed using a voice-to-text algorithm installed on the remote server, then the IM is sent as a new message to the computing devices associated with the second party over a telecommunications network.

5. The method of claim 1, further comprising sending a multi-media file comprising the voicemail along with the text, thereby the IM is comprised of both audio and transcription text, indivisible.

6. A system for transforming a voice message into a communication session between a first party and a second party, the system comprising:
   a remote server to which an electronic device of the first party subscribes, the remote server receiving a voicemail from the first party which is destined for the second party, the voicemail being recorded by the first party when a call to the second party is not answered or not made; the remote server executing instructions for transcribing the voicemail including transforming the voicemail into a text, the remote server sending the text and audio as a multi-media instant message (IM) to the first party and to the second party to establish a chat session between the first party and the second party, the IM being sent to more than one computing device associated with the first party and/or more than one computing device associated with the second party, the IM appearing as an outgoing message in a first chat window on one or more computing devices associated with the first party, and as an incoming message in a second chat window on one or more computing devices associated with the second party.

7. The system of claim 6, wherein the remote server comprises a single server for recording the voicemail and transcribing the voicemail to the text.

8. The system of claim 6, wherein the remote server comprises a voicemail server for recording the voicemail and a transcription server in communication with the voicemail server for transcribing the voicemail to the text.

9. The system of claim 6, wherein the remote server comprises a plurality of servers operating in a network for recording the voicemail and transcribing the voicemail to the text.

10. A method for transforming and integrating a voicemail into a chat session between a first party and a second party, the method comprising:
   receiving, at a remote server, a voicemail from the first party which is destined for the second party, the voicemail being recorded by the first party when a call to the second party is not answered or not made;
   transcribing the voicemail including transforming the voicemail into a text; and
   forwarding to the chat session between the first party and the second party, a multi-media instant message (IM) including the text and an audio record of the voicemail, the IM being forwarded to more than one computing device associated with the first party and/or more than one computing device associated with the second party, the IM appearing as an outgoing message in a first chat window on one or more computing devices associated with the first party displaying the chat session, and as an incoming message in a second chat window on one or more computing devices associated with the second party displaying the chat session.

11. The method of claim 10, wherein the voicemail is transcribed using a voice-to-text algorithm installed on the remote server.

12. The method of claim 10, wherein the audio is recorded on a first computing device associated with the first party and streamed over a telecommunications network to be transcribed using a voice-to-text algorithm installed on the remote server, then the IM is sent as a new message to the computing devices associated with the second party over a telecommunications network.

13. The method of claim 12, further comprising:
before forwarding the IM to the chat session, sending the text to the computing devices associated with the first party and instructing them to present the text in an editable format;
recording edits on the text by a first computing device associated with the first party and sending the text as edited to the remote server; and
sending the IM to the computing devices associated with the second party immediately followed by the text as edited.

14. The method of claim 10, further comprising sending a multi-media file comprising the voicemail along with the text, thereby the IM is comprised of both audio and transcription text, indivisible.

\* \* \* \* \*